United States Patent
Medynski

[15] 3,693,511
[45] Sept. 26, 1972

[54] ROAD STUDS

[72] Inventor: Mieczyslaw Tadeusz Wladyslaw Medynski, Kingfishers, Brookthorpe, Gloucestershire, England

[22] Filed: Dec. 16, 1970

[21] Appl. No.: 98,771

[30] Foreign Application Priority Data

Dec. 16, 1969 Great Britain........61161/69

[52] U.S. Cl. ....................................................94/1.5
[51] Int. Cl. ............................................E01c 23/16
[58] Field of Search........................................94/1.5

[56] References Cited

UNITED STATES PATENTS

| | | |
|---|---|---|
| 3,409,344 | 11/1968 | Balint ....................94/1.5 X |
| 3,392,639 | 7/1968 | Heenan ........................94/1.5 |
| 3,516,337 | 6/1970 | Gubela ..........................94/1.5 |
| 2,515,847 | 7/1950 | Winkler..........................94/7 X |
| 3,499,371 | 3/1970 | Jonnes..........................94/1.5 |
| 2,294,930 | 9/1942 | Palmquist ..............94/1.5 UX |

*Primary Examiner*—Jacob L. Nackenoff
*Attorney*—Young & Thompson

[57] ABSTRACT

A reflective road stud or 'cat's eye' has a body moulded of flexible and resilient rubber or the like in which at least one reflective element is housed, which element has projections by which it is retained in position and which provide a "snap-in" fixing utilizing the natural resilience of the body material. The body may have an extensive flat under-surface secured to the road by a suitable adhesive, preferably a thermo-set resin sprayed on to the road surface or an emulsified epoxy resin mortar so that work can continue in wet weather as a dry road surface is not required. The reflective element may be a rigid plastics moulding with rows of inset bead like reflecting lenses.

7 Claims, 4 Drawing Figures

PATENTED SEP 26 1972　　　　　　　　　　　　3,693,511

INVENTOR
MIECZYSLAW T. W. MEDYNSKI
BY Young & Thompson
ATTORNEYS

ROAD STUDS

This invention relates to reflective road studs of the type commonly referred to as "cat's eyes" and which are secured at spaced intervals so as to indicate at night the center line of a road, for example. The studs incorporate reflective elements which reflect the headlamp beams of a vehicle at night.

According to the invention a road stud has a body moulded from a flexible and resilient rubber or rubber-like material in which at least one reflective element is housed, which element has projections by which it is retained in position and which provide a "snap-in" fixing utilizing the natural resilience of the body material.

Preferably the body has an extensive flat under-surface or extensive flat under-surface portions to be secured to the road by a suitable adhesive, and for this purpose a thermo-set resin sprayed on to the road surface or an emulsified epoxy resin mortar is desirably employed with the advantage that work can continue in wet weather as a dry road surface is not required. The under-surface of the body may have a grooved formation to accept an epoxy resin mortar adhesive and to provide a keying effect which improves adhesion.

Preferably the body is moulded from a fairly soft material with the advantage that it adheres better to the road surface, particularly because it tends to yield on impact and thus also provides less shock to a vehicle running over the stud, and the additional advantage that if it should become detached it will not cause serious damage when thrown up by the wheels of passing vehicles. Such damage is a serious problem with the conventional type of cat's eyes which have cast-iron body frames. My experiments to date have shown that rubber possessing a Shore hardness of between 60 and 80 provides a satisfactory product. It may be formulated in accordance with British Standard Specification 1154 Y3/BS 903 Part 13 which provides characteristics of good abrasion and ozone resistance.

The reflective elements may be suitably colored, for example an element on one side of the body providing a white "natural" reflection to vehicles travelling in one direction, and a red reflective element on the other side which is operative so far as drivers travelling in the opposite direction are concerned. The or each element may be of plate like form with edge projections by which it is retained and a plurality of reflecting members. Said element is in preferred constructions provided by an elongated rigid plastics moulding with inset spaced reflecting members. The reflecting members are desirably in the form of small thick bi-convex lenses with reflecting backings.

The invention also resides in a system of road studding wherein road studs having the features described are secured to a road surface by an adhesive, the preferred adhesive being a thermo-set resin or an emulsified epoxy resin.

An embodiment of the invention in the form of a road stud designed for fixing to the road surface using a thermo-set resin or emulsified epoxy resin mortar will now be described by way of example, and with reference to the accompanying drawings, in which.

Figure 1:
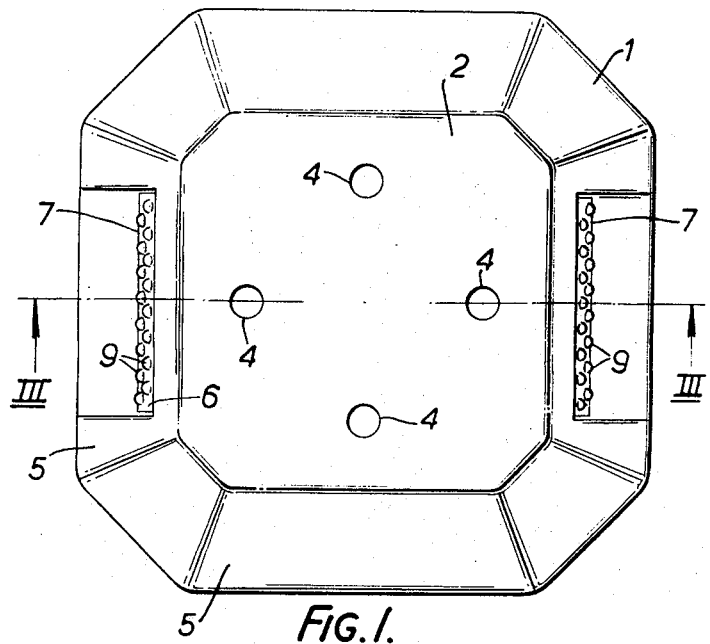
FIG. 1 is a plan view of the road stud.
Figure 2:
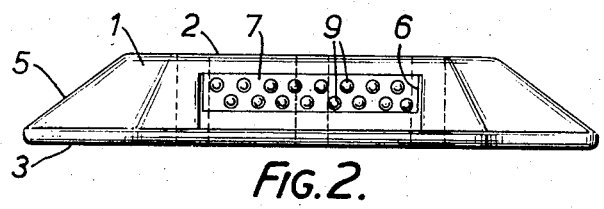
FIG. 2 is a corresponding side elevation.
Figure 3:
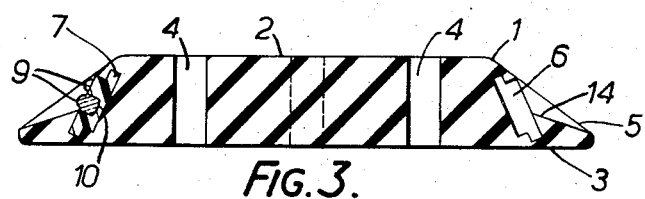
FIG. 3 is a section on the line III — III of FIG. 1, but with one of two reflective elements removed.

Referring to the drawings, the stud has a body 1 moulded from rubber in accordance with the aforesaid British standard and having a flat top face 2 and a larger flat bottom or underface 3 presenting an extended surface to be adhered to the road surface by means of sprayed resin or epoxy resin mortar. The moulding is formed with four through holes 4 extending between the top face 2 and the underface 3, to assist in venting air from the underface 3 of the stud when the latter is applied and adhered to the road surface. In the adhering process, it normally suffices to coat the road surface by spraying with resin or by applying emulsified resin mortar and then to apply the stud, the underface 3 of which is prepared by buffing, but, alternatively or additionally, the underface 3 of the stud may be coated with resin. The resin rises a little up the holes 4 which thus tends to have a keying effect between the resin and the stud. Additionally the underface 3 may be grooved or recessed, the grooves or recesses being for example of rectangular section, to provide a key for the resin.

In plan view both the top face 2 and the underface 3 are of basically square form with the corners cut off, and the ridge-like side surfaces 5 are inclined to the top face 2 and underface 3 at an angle of about 40°.

Figure 4:
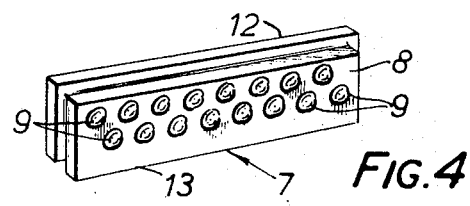
FIG. 4 is a view of a reflective element which is a component of the road stud of FIGS. 1 to 3.

At two opposite sides of the body 1 the inclined side surfaces 5 are moulded with inset housings 6 for reflective elements 7, each of which has a snap-in fixing into the corresponding housing 6. As shown in FIG. 4, each reflective element 7 comprises a rigid plastics body moulding 8 of rectangular form elongated in the horizontal direction, and has two horizontal rows of eight spaced and moulded-in reflecting members 9. Each reflecting member 9 is a small glass bead, constituting a thick lens, bi-convex, the rear face being of spherical curvature with a metallic reflecting backing 10 and the front face having a protuberance of approximately spherical curvature of smaller radius. The body moulding 8 has edges stepped to provide a rear lip 12 extending along the top and two ends of the moulding 8 and a front lip 13 extending along the bottom of the moulding. The lips 12 and 13 in association with the resilience of the rubber body moulding 1 provide the snap-in fixing. Each housing recess 6 conforms to the shape of the rigid body moulding 8 of the reflective element 7 and is moulded so that its outer rim 14 tends to overlap the corresponding reflective element 7 and thus assists in retaining the latter.

I claim:

1. A road stud comprising a yielding resilient rubber or rubber-like body with at least one reflective insert and having a flat underface to be adhered directly to the road surface, the reflective insert being formed of an array of individually reflective beads moulded in a rigid flat-faced insert presenting projecting edges and snapped in and held obliquely in a lipped recess moulded in a sloping side wall of the body.

2. A road stud according to claim 1, wherein the body is moulded from a material of a softness to conform to the road surface while being adhered and to yield on subsequent impact.

3. A road stud according to claim 1, wherein the body is moulded from rubber possessing a Shore hardness of between 60 and 80.

4. A road stud according to claim 1, wherein the body has through holes extending from the underface to assist in venting air during application and adherence of the stud to the road surface.

5. A road stud according to claim 1, wherein the insert is a plastics strip, at least one of the longer edge faces of the strip being stepped to seat in a matching portion of the lipped recess moulded in the body.

6. A road stud according to claim 5, wherein each of the longer edge faces of the strip is stepped to provide outwardly projecting lips respectively along the rear of the top edge and along the front of the bottom edge.

7. A system of road studding comprising road studs according to claim 1, each of the studs, with at least one insert snapped in, being adhered to the road surface by means of a resin of the class comprising thermo-set resin and emulsified epoxy resin.

* * * * *

UNITED STATES PATENT OFFICE
CERTIFICATE OF CORRECTION

Patent No. 3,693,511　　　　Dated September 26, 1972

Inventor(s) Mieczyslaw Tadeusz Wladyslaw Medynski

It is certified that error appears in the above-identified patent and that said Letters Patent are hereby corrected as shown below:

On the cover sheet, insert -- [73] Assignee: Unistud Limited, Gloucester, England, a British Company -- .

Signed and sealed this 8th day of May 1973.

(SEAL)
Attest:

EDWARD M. FLETCHER, JR.　　　　ROBERT GOTTSCHALK
Attesting Officer　　　　　　　　Commissioner of Patents